United States Patent Office 2,927,906
Patented Mar. 8, 1960

2,927,906

SOLUTION OF POLYAMIDES IN TRIFLUOROETHYL ALCOHOL AND PROCESS OF MAKING SAME

Paul Schlack, Leitershofen, Augsburg-Land, Germany, assignor to Farbwerke Hoechst Aktiengesellschaft vormals Meister Lucius & Brüning, Frankfurt am Main, Germany, a corporation of Germany No Drawing. Application April 9, 1957
Serial No. 651,586

Claims priority, application Germany April 11, 1956

6 Claims. (Cl. 260—30.8)

The present invention relates to a process for preparing solutions of synthetic polyamides of high molecular weight.

It is known that trichloroethyl alcohol alone or in admixture with other solvents, such as alcohols, halogenated hydrocarbons, if desired in the presence of small amounts of water, is a solvent for linear polyamides. Although it is possible to prepare from solutions of this kind useful films and foils, the process did not gain any practical importance because of the high boiling point of trichloroethyl alcohol (151° C.).

Now I have found that technically more valuable solutions of synthetic polyamides can be obtained by dissolving polyamides of high molecular weight in solvents consisting wholly or partially of the water-miscible trifluoroethyl alcohol boiling at 74° C. It is remarkable that the trifluoroethyl alcohol which is readily accessible dissolves very well polyamides and especially the usually very sparingly soluble and highly crystalline high melting polyamides of various types having a uniform structure. In certain cases it is necessary to use additionally other effective solvents for polyamides, for example phenols. In this manner it has become possible to shape from a readily volatile and practically neutral solvent polyamides which are not cross-linked, especially those which cannot be processed from the molten mass owing to thermal instability, for example the linear polyamide of tetramethylenediamine and adipic acid, furthermore polyureas, such as the polyurea of decamethylenediamine or of 3-methyl-hexamethylenediamine, polyurethanes, especially polyurethanes melting above 190–200° C. for example the polyurethane of para-xylylene-diisocyanate and tetramethylene glycol, for example into filaments, foils or coatings. This favorable behavior of trifluoroethyl alcohol was not at all to be foreseen since the β-fluoroethyl alcohol, for example, does not show a substantially better dissolving power as compared with ethyl alcohol for alcohol-soluble copolyamides, such as the copolyamide of caprolactam and adipic acid hexamethylenediamine (40:60).

Generally the solubility of the polyamides is the better the higher their capacity of absorbing water is. Therefore, it is necessary to apply correspondingly higher temperatures in the case of strongly hydrophobic products and, if necessary, to work under pressure in order to obtain homogeneous solution. The commercial fiber-forming polyamides, such as polyhexamethyleneadipic amide and polycaprolactam are dissolved by trifluoroethyl alcohol already at room temperature, whereby solutions of 12–20% strength are easily obtained, especially in the case the mixture is intensely and mechanically worked while stirring. For the preparation of higher concentrated solutions it may be necessary to heat the mixture according to the degree of viscosity. In the cold, i.e. at temperatures between 10–30° C., there are soluble in trifluoroethyl alcohol the alcohol-insoluble as well as especially the alcohol-soluble copolyamides of ε-aminocaproic acid or ε-caprolactam and adipic acid hexamethylenediamine also in a relatively high concentration. Distinctively hydrophobic polyamides, such as polyhexamethylenesebacic amide and the polyurethane of 1,4-butanediol and hexamethylene-diisocyanate, furthermore the alcohol-insoluble copolyamides of ε-caprolactam or adipic acid hexamethylenediamine and terephthalic acid hexamethylenediamine are soluble only at temperatures above room temperature.

According to the kind of polyamide to be dissolved temperatures between 30° and 120° C. are applied whereby at temperatures above the boiling point of trifluoroethyl alcohol it is, therefore, necessary to carry out the dissolution in a pressure vessel.

In the course of the dissolution process it is important not to apply high temperatures in a range such that the polyamides decompose or the solvent causes decomposition on heating.

Polyamides which are characterized by very strong hydrogen bonding, such as polyureas and especially polyoxamides, particularly those of unbranched polymethylenediamines, require, as a rule, the addition of very effective other solvents for the formation of homogeneous solutions, such, as, for example, phenol, 2-chlorophenol, m-cresol or para-cresol, 1-hydroxyphenyl-4-methylsulfone or dichloroacetic acid. This also applies to polyamides having extremely long polymethylene chains, for example those having more than 10 carbon atoms in the polymethylene radicals. An example therefor is the polyamide of ω-amino-undecylic acid.

The solvent mixtures which may be used in the process of the invention consist, for example, of 70 to 99% of trifluoroethyl alcohol and 30 to 1% of one or more of the solvents for polyamides mentioned above. The mixing proportions may vary within wide limits according to the solubility of the polyamides depending on their structure. The presence of chain interrupting heteroatoms in the polymethylene radicals, for example of oxygen, sulfur, NH or NR groups (whereby R represents a lower alkyl radical) influences positively the solubility. The same holds true for polyamides with lateral substitution at the carbon or nitrogen atom.

It is important and surprising that also some synthetic polypeptides of α-amino acids, especially those having longer alkyl radicals and particularly copolymers dissolve in trifluoroethyl alcohol alone or after the addition of other solvents, such as halogenated hydrocarbons, for example chloroform or ethylene chloride, furthermore dichloroacetic acid and that they can then be worked up from solutions of this kind to form threads or foils.

The dissolving power of trifluoroethyl alcohol is not limited to polyamides with strongly linear structure. Also branched polyamides of high molecular weight, even those having an especially high viscosity, are soluble in trifluoroethyl alcohol, for example polyamides as obtained by polycondensing polycarboxylic acids of high molecular weight of the kind of polyacrylic acid, copolymers of maleic anhydride and simple vinyl compounds, such as styrolene or vinyl-pyrolidone with ω-amino carboxylic acids or the lactams thereof. The same holds true also for the analogous polycondensates of amino acids or lactams and polyfunctional carboxylic or amino compounds, such as polyethyleneimine, for polycondensates of higher polymethylenediamines and dihalogen alkanes or primary polyamines as obtained when adding 5–6 mols of acrylonitrile to formamide and then hydrogenating the addition products.

The solutions obtained according to the process of the invention can be diluted in most cases with other solvents or latent organic dissolvers active for polyamides, for example with water, methanol, β-chloroethanol, trichloroethanol, butanediol, tetrahydrofurfuryl alcohol, methylene chloride, chloroform, trichloroethylene, formyl-tetrahydrofurfuryl amine, formic acid, acetic acid, dichloroacetic acid, trifluoroacetic acid, formamide, dimethylformamide, m-cresol or resorcin. It is, furthermore, possible to use mixtures of trifluoroethyl alcohol and the solvents or latent solvents mentioned above in order to prepare the solutions of polyamides.

An addition of higher boiling hydroxyl compounds, such as hexamethylene glycol, triethylene glycol, tetrahydrofurfuryl alcohol in certain amounts, for example between 5 and 20%, calculated on the polyamide, proves to be especially suitable in some cases because by this step the premature crystallization of the structures after the evaporation of the trifluoroethyl alcohol is delayed and the working up of the structures by orienting stretching, pressing or rolling is facilitated. This holds true above all for polyamides having reactive hydrogen atoms since in this case aggregations take place very quickly and to a greater extent. Of course, the solutions according to the present invention may contain difficultly volatile or nonvolatile plasticizers, such as, for example, lactams, arylsulfonalkylamides and, in addition to the phenols already mentioned, higher alkylphenols, such as isohexylphenol or isododecylphenol.

The working up of the solutions into shaped structures can be carried out according to the evaporation process or by pressing the solutions through nozzles into precipitating baths. In the case of the evaporation process it is suitable to work at low relative atmospheric moisture and to take care, if desired, by appropriate composition of the solvent mixture that water does not concentrate in the structures in the course of the evaporation, for example by adding higher boiling solvents or latent dissolvers. The evaporated solvents can be recovered by condensation, absorption or by washing with strongly dissolving liquids, for example chlorinated hydrocarbons or phenols. They can be removed from the precipitating baths by extraction with organic solvents, especially by means of chlorinated hydrocarbons, such as methylene chloride or chloroform in a cycle process.

By "polyamides of high molecular weight" according to the present invention are to be understood the following products: Linear polymers containing in the chain a great number of —NH—CO— groups, for example polyamides of diamines and dicarboxylic acids and the amide-forming derivatives thereof, polyamides of ω-aminocarboxylic acids, and amide-forming derivatives thereof, especially lactams, polyureas, polyurethanes and synthetic polypeptides. There are mentioned in detail: The polyamides of oxalic acid, adipic acid, suberic acid, azelaic acid, sebacic acid with diamines, such as tetramethylenediamine, hexamethylenediamine, β-methylhexamethylenediamine, decamethylenediamine, the polyamide of ε-aminocaproic acid (polycaprolactam), of 7-aminoheptanoic acid, of 9-aminononanoic acid, of 11-aminoundecanoic acid, furthermore copolymers of at least 3 polyamide-forming components, for example the copolymer of 60 parts of hexamethylenediamine adipate and 40 parts of caprolactam, the copolymer of caprolactam or hexamethylenediamine adipate and hexamethylenediamine terephthalate, polyureas prepared from carbonic acid diphenylester and decamethylenediamine, of hexamethylenediisocyanate and N-methyl-hexamethylenediamine, of hexamethylenediisocyanate and decamethylenediamine, the polythiourea prepared by addition polymerization of hexamethylenediisothiocyanate to monobutylhexamethylenediamine, the polyurethanes of hexamethylenediisocyanate and tetramethylene glycol and hexamethylene glycol, the polyurethane of hexamethylene-bis-chloroformiate and ethylenediamine.

The manufacture of polyamides of high molecular weight is described in U.S. Patents Nos. 2,071,253, 2,130,523, 2,130,948 and 2,241,321 and in German Patent No. 728,981.

The solutions according to the invention can be used as as bonding agents for filaments, foils and shaped structures of polyamides and to laminate foils on supporting bases.

The following examples serve to illustrate the invention but they are not intended to limit it thereto, the parts being by weight unless otherwise stated.

*Example 1*

20 parts of polycaprolactam (relative viscosity 2.6, determined in a solution of 1% strength in m-cresol at 20° C.) are dissolved at the boil in 80 parts of trifluoroethyl alcohol while stirring. A colorless, limpid and viscous solution is rapidly formed. In the case the solution is cast to obtain a film and the solvent is evaporated at 50° C., a limpid stretchable film is formed.

When only 16 parts of polycaprolactam are used, dissolution occurs rather quickly already at 20° C. One part by volume of this solution of 16% strength can be diluted with one part by volume of methanol without any precipitation taking place. It is, furthermore, possible to add more than 3 parts by volume of glacial acetic acid to one part by volume of the solution of 16% strength without any turbidity occurring at room temperature.

*Example 2*

10 parts of waste fibres of polycaprolactam (relative viscosity 2.4) are stirred with 90 parts of a mixture consisting of equal parts of trifluoroethyl alcohol and glacial acetic acid at 60° C. The polyamide dissolves quite rapidly yielding a limpid viscous solution which slowly gelatinates without turbidity while standing at room temperature.

*Example 3*

15 parts of polyhexamethylenesebacic amide are stirred in the heat with 85 parts of trifluoroethyl alcohol, first at 60° C., then at boiling temperature. Within a short time a limpid solution is obtained which can be cast to films.

*Example 4*

The copolyamide of 60 parts of adipic acid hexamethylenediamine and 40 parts of ε-caprolactam is dissolved at 20° C. in trifluoroethyl alcohol yielding a solution of 20% strength. One part by volume of this solution can then be diluted with more than 2 parts by volume of methyl alcohol without turbidity occurring at room temperature.

*Example 5*

One part of the copolyamide of caprolactam, adipic acid hexamethylenediamine and adipic acid 4.4′-diaminedicyclohexylmethane in a proportion by weight of 1:1:1 are dissolved at room temperature in 4 parts of trifluoroethyl alcohol. The viscous solution of 20% strength remains limpid after the addition of the double volume of glacial acetic acid as well as after the addition of double the volume of methyl alcohol. In the latter case the solution can be further diluted with a small amount of water.

*Example 6*

12 parts of the branched polyamide of ε-caprolactam and 2 mol percent (calculated on the lactam) of the copolymer of styrolene and maleic anhydride in a proportion by weight of 1:1 (relative viscosity 4.23) are stirred with 88 parts of trifluoroethyl alcohol. Already at room temperature strong swelling sets in. At 50° C. a highly viscous solution is formed which remains on cooling first limpid and homogeneous but which becomes gelatinous after standing for 15 hours at 20° C. By heating for a short time the solution again becomes homogeneous. From this solution there can be cast extremely viscous, almost limpid films which can be well stretched.

Example 7

The branched polyamide prepared by polymerizing 97.4% of caprolactam and 2.6% of the copolymer of vinylpyrrolidone and acrylic acid in a proportion by weight of 60:40 (relative viscosity 4.20) is stirred with 88 parts of trifluoroethyl alcohol. In spite of the very high viscosity, a nearly homogeneous solution is obtained already at 20° C. After heating to 60° C., the solution remains limpid and homogeneous even in the cold.

Example 8

12 parts of the alcohol-insoluble copolyamide of 58 parts of terephthalic acid hexamethylenediamine and 42 parts of ε-caprolactam (melting point 242° C., relative viscosity 2.0) are dissolved in 88 parts of trifluoroethyl alcohol at boiling temperature. After a short boiling time a satisfactory solution is obtained which, when evaporating the solvent at 55° C., yields limpid and elastic films. The solution solidifies at room temperature and forms a limpid gel which reversibly liquefies in the heat.

Example 9

12 parts of poly-α-pyrrolidone (melting point 265° C., relative viscosity 2.5) are dissolved at 20° C. by stirring with 88 parts of trifluoroethyl alcohol. The viscous solution thus obtained can be diluted to a large extent with glacial acetic acid or with water at room temperature. To 1 part by volume of said solution more than 2 parts by volume of water can be added without flocculation taking place. Contrary thereto already small amounts of methyl alcohol cause a precipitation at room temperature. It is possible, however, to dissolve this precipitate by adding water.

Example 10

12 parts of highly viscous poly-α-pyrrolidone (relative viscosity 6.4) are stirred at room temperature with 88 parts of trifluoroethyl alcohol. Swelling occurs rapidly. When heating to the boil, a homogeneous solution is quickly obtained. The solution remains limpid after standing for 3 days at room temperature. When evaporating the solvent at 55° C., a nearly limpid film is obtained which can be well stretched. The solution tolerates the addition of considerable amounts of water or glacial acetic acid. Also the water-containing solution to which glacial acetic acid has been added leaves limpid films when evaporated at 50° C. By adding methyl alcohol to the solution a flocculent precipitate is formed.

Example 11

12 parts of the polypeptide of equal parts of α-amino-n-butyric acid-N-carboxylic anhydride and α-aminoisobutyric acid-N-carboxyanhydride (relative viscosity 1.7) are dissolved at room temperature in 88 parts of trifluoroethyl alcohol. After evaporating the solvent, almost limpid viscous films are obtained. The solution is still improved by adding 20% of dichloroacetic acid, calculated on the polypeptide.

Example 12

One part of polyhexamethyleneurea is dissolved at 55° C. in a mixture of 2.5 parts of m-cresol and 10 parts of trifluoroethyl alcohol. The limpid solution remains liquid on cooling.

Example 13

Polyhexamethylene-oxamide which is insoluble in cresol at 80° C. dissolves when being boiled under reflux in a mixture of 10 parts of m-cresol and 10 parts of trifluoroethyl alcohol. The solution is only stable in the heat and solidifies in the cold to form a limpid gel.

Example 14

15 parts of the polyoxamide of 1.4-tetramethylene-bis-γ-aminopropyl ether (relative viscosity determined in a solution of 0.5% strength in m-cresol at 20° C.=1.45) are dissolved at 40° C. in 10 parts of m-cresol and 75 parts of trifluoroethyl alcohol. When evaporating the solvent at 30–40° C., there remains a foil from which the cresol still present is washed out with methyl alcohol.

Example 15

The same polyamide as mentioned in Example 14 is dissolved in the presence of 10% of hexamethylene glycol, calculated on the polyamide, in trifluoroethyl alcohol in order to form a solution of 15% strength. After evaporating the solvent at room temperature, an orientable film is obtained.

Example 16

12 parts of the polyurethane of 1.4-butanediol and hexamethylenediisocyanate are covered with 88 parts of trifluoroethyl alcohol. Practically no swelling takes place at room temperature. Only at 60° C. a homogeneous solution is formed which does not gelatinate but precipitates on cooling.

Example 17

12 parts of the polyamide of ω-amino-undecylic acid are mixed with 3.5 parts of m-cresol and 84.5 parts of trifluoroethyl alcohol. Swelling sets in at once and on gentle warming dissolution occurs very rapidly. Without the addition of cresol the polyamide remains undissolved even in the heat.

Example 18

10 parts of highly viscous poly-α-pyrrolidone (relative viscosity 6.4) are covered with 90 parts of a solvent mixture consisting of 55 parts of trifluoroethyl alcohol, 20 parts of water in 25 parts of ethylene-chlorhydrin and heated under reflux to the boil while stirring. A limpid solution is obtained which, after evaporating the solvent at 40° C., yields viscous and stretchable limpid films.

Example 19

20 parts of the polyamide of ω-amino-undecanoic acid are heated with 100 parts of a mixture consisting of 97 parts of trifluoroethyl alcohol and 3 parts of dichloroacetic acid. After a short time swelling and dissolution takes place. When evaporating the solvent at 30–40° C., the polyamide remains in the form of a slightly turbid foil.

The viscosity figures mentioned in the examples are, as far as not indicated otherwise, determined in an Ostwald type viscosimeter at 20° C. using a solution in m-cresol containing 1 g. of polyamide in 100 cc. of liquid.

I claim:

1. A process for the manufacture of solutions of long chain synthetic polymeric amides which have recurring amide groups as an integral part of the main polymer chain and which are capable of being formed into fibers, which comprises dissolving said polyamides in trifluoroethyl alcohol.

2. A process for the manufacture of solutions of long chain synthetic polymeric amides which have recurring amide groups as an integral part of the main polymer chain and which are capable of being formed into fibers, which comprises dissolving said polyamides in a mixture of at least 50% of trifluoroethyl alcohol with at least one substance selected from the group consisting of phenol, 1-hydroxyphenyl-4-methylsulfone, 2-chlorophenol, m-cresol, p-cresol and dichloroacetic acid.

3. A process as claimed in claim 1, which comprises preparing the solutions at a temperature between 10 and 30° C.

4. A process as claimed in claim 1, which comprises preparing the solutions at a temperature in the range from 30–120° C.

5. Solutions of synthetic long chain synthetic polymeric amides which have recurring amide groups as an integral part of the main polymer chain and which are capable of being formed into fibers in a mixture of at least 50% of trifluoroethyl alcohol with at least one substance selected from the group consisting of phenol, 1-hydroxyphenyl-4-methylsulfone, 2-chlorophenol, m-cresol, p-cresol and dichloroacetic acid.

6. A solution of a long chain synthetic polymeric amide which has recurring amide groups as an integral part of the main polymer chain and which is capable of being formed into fibers in a solvent essentially comprising trifluoroethyl alcohol.

References Cited in the file of this patent

UNITED STATES PATENTS

| | | |
|---|---|---|
| 1,979,614 | Goth et al. | Nov. 6, 1934 |
| 2,342,387 | Catlin | Feb. 22, 1944 |

OTHER REFERENCES

Henne et al.: "Trifluoroethanol," 70 J.A.C.S., 1968 (1948).